Sept. 13, 1966 J. P. CURTIS 3,273,079

HYBRID CIRCUIT HAVING SEPARATE COUPLING TRANSFORMERS AT THE SUM PORT AND DIFFERENCE PORT AND HAVING TUNING MEANS TO IMPROVE OPERATION

Filed March 5, 1964

INVENTOR.
JOHN P. CURTIS

BY

Dike, Thompson, Bronstein & Mrose

ATTORNEYS 3,273,079

HYBRID CIRCUIT HAVING SEPARATE COUPLING TRANSFORMERS AT THE SUM PORT AND DIFFERENCE PORT AND HAVING TUNING MEANS TO IMPROVE OPERATION

John P. Curtis, Reading, Mass., assignor to Adams-Russell Co., Inc., Waltham, Mass., a corporation of Massachusetts Filed Mar. 5, 1964, Ser. No. 349,583
11 Claims. (Cl. 333—11)

The present invention relates to improvements in electrical hybrid circuitry and, in one particular aspect, to unique and improved four-port electrical network devices of miniature rugged construction which efficiently perform functions involving signal divisions or summations over unusually broad ranges of frequencies without requiring adjustments to maintain broadband and high-quality isolation characteristics.

Various forms of electrical networks have been devised for such diverse purposes as matched coupling, power division, duplexing, balun conversions, mixing, and the like. In accordance with known theories, it has been possible to design certain of these networks to suppress losses and to secure near-ideal matching at relatively low frequencies which do not vary over wide ranges; however, at higher frequencies, unavoidable variations in reactance, and particularly leakage reactance, characteristics seriously influence network performance and prevent satisfactory broadband operation unless circuit parameters are varied to effect needed compensations. It is highly advantageous, where possible, to avoid adjustment requirements and, instead, to provide inherently broadband operating capabilities; moreover, versatility, economy and utility are enhanced where a single network design will serve a number of different purposes. The present teachings are concerned with networks which offer the latter features, and, notably, broadband radio frequency hybrid circuits which exploit compensated non-ideal circuit elements to enable precision splitting of signals or the resolution of difference inputs into sum and different outputs.

It is one of the objects of this inventioin, therefore, to provide novel and improved radio-frequency hybrid circuitry of low-cost practical form exhibiting high-performance characteristics over wide ranges of frequencies without adjustment.

Another object is to provide unique four-port broadband hybrid networks for dividing power or for resolving independent signals into their algebraic sum and difference, with low losses and a high degree of isolation.

A further object is to provide efficient high-frequency networks in integrated ruggedized form which are useful in obtaining divided, summed, and difference signal outputs, and in which capacitive compensations and magnetic circuit isolations develop high-performance capabilities over broad ranges of frequencies.

Still further, it is an object to provide improved hybrid networks in which shunt and series leakage inductances are incorporated into bandpass filter circuitry which minimizes losses and preserves impedances substantially constant with wide-ranging frequency.

By way of a summary account of practice of this invention in one of its aspects, a hybrid network is constructed using three independent inductance units each fully enclosed within and shielded by core material, and a number of capacitors which are effective to compensate for the specific shunt and series inductance components of the non-ideal inductance units. Two of the inductance units are in the form of magnetically-isolated transformers, one of which is a balance-to-unbalance transformer serving one pair of terminals (i.e., one port), and the second of which is primarily an impedance-matching transformer serving another pair of terminals (i.e., a second port) of the hybrid device. Intermediate these transformers there is located a symmetrically disposed center-tapped coil unit, the ends of which are connected across one winding of the balun transformer, and the center of which is serially connected with one winding of the second transformer. Third and fourth ports for the device are each formed between a different end of the center-tapped coil and a grounded end of the transformer winding which is in series with the center tap. The compensating capacitors are connected in shunt and series relationships which minimize the effects of leakage parameters by making them part of a bandpass filter arrangement. Power division, with isolation, is achieved at the third and fourth ports when an input is applied to the second, and different signals applied to the third and fourth ports will yield a difference signal at the first port and a summation signal at the second.

Although the features of this invention which are believed to be novel are set forth in the appended claims, specific details as to its practice in preferred embodiments, and the further objects and advantages thereof, may best be perceived through reference to the following description taken in connection with the accompanying drawings, wherein:

Figures 1, 2, 3, 4, 5, 6:
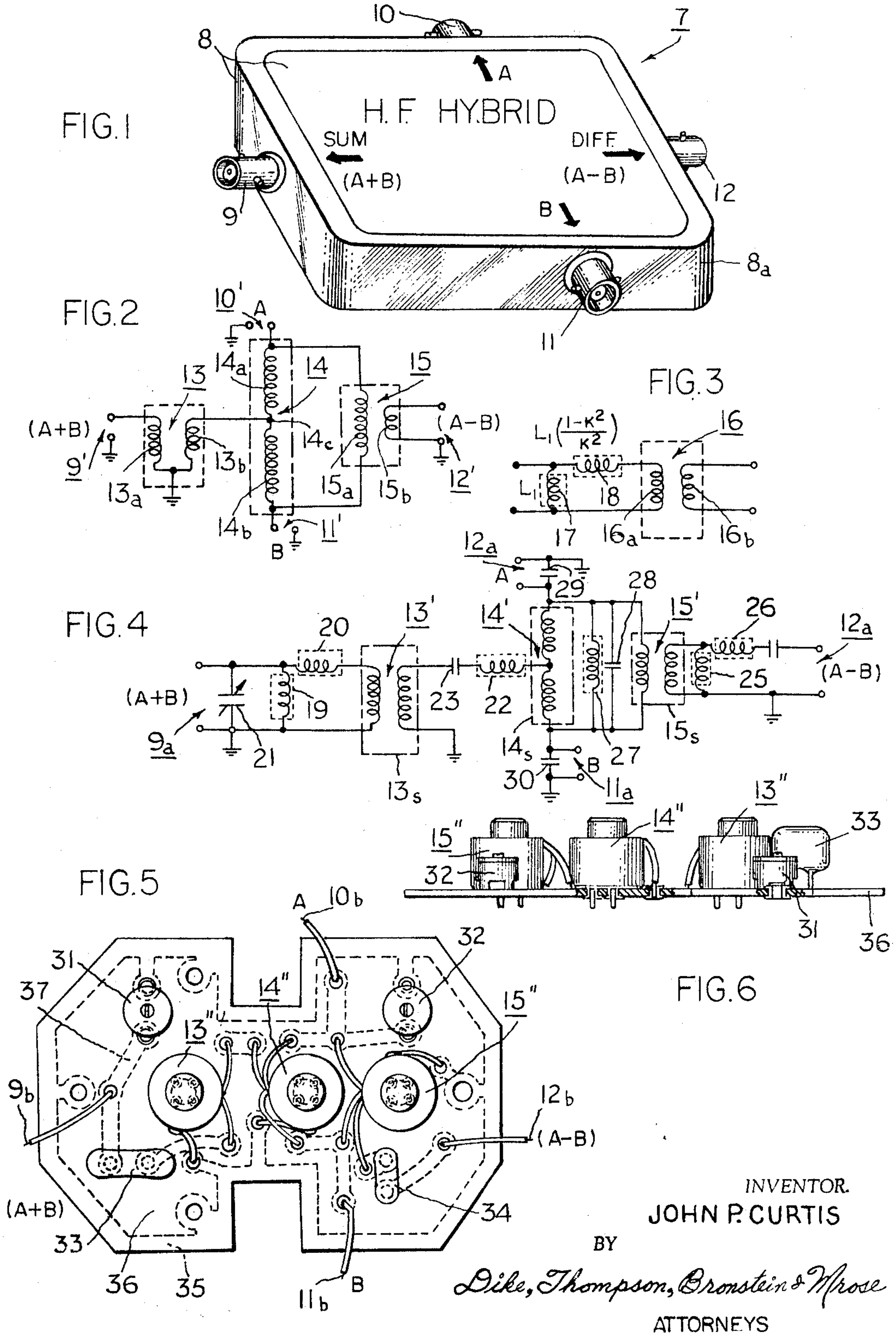
FIGURE 1 is a pictorial representation of an improved non-adjustable high-frequency broadband hybrid device integrated into a fully-enclosed four-port assembly suitable for exposure to severe environmental conditions.
FIGURE 2 is a schematic diagram of an idealized hybrid network.

FIGURE 3 schematically characterizes a transformer unit of the FIGURE 2 network, with leakage parameters included;

FIGURE 4 provides a schematic representation of a preferred four-port broadband hybrid network which includes capacitance elements in bandpass filter circuit relationships with illustrated shunt and series leakage inductance parameters;

FIGURE 5 is a plan view of a printed-circuit sub-assembly for an improved hybrid device; and FIGURE 6 is a side view of the sub-assembly of FIGURE 5.

Equipment 7 in FIGURE 1 represents a preferred assembled version of a hybrid network constructed in accordance with these teachings, and this is in the form of an integrated and substantially monolithic unit 8 having four cable connectors 9–12 as the only means for access to internally-contained circuitry. External adjustment provisions are absent, all circuit regulations having been completed before the rigid potting of a printed-circuit hybrid sub-assembly within the generally rectangular conductive (aluminum) enclosure 8*a*. For reasons which appear later herein, this equipment may function efficiently, over a broad range of high frequencies (example: 5 mc. to 32 mc. range, in one embodiment), to produce two equal amplitude, identically phased, isolated outputs (i.e., as a power divider with isolation), to produce two equal amplitude, oppositely phased, isolated outputs (i.e., as a broadband balun), and as a means of combining two non-coherent signals maintaining source isolation (i.e., as a balanced mixer, modulator, or duplexer). The port legends marked on the top plate of the equipment characterize its use and functions: signals applied to connectors 10 (labelled A) and 11 (labelled B) will yield a summation output signal (labelled A & B) at connector 9 and, if there is a difference between the signals, a difference output signal (labelled A–B) at connector 12; a signal applied to connector 9 will yield two equal amplitude isolated outputs of the same phase at the connectors 10(A) and 11(B), thereby achieving a power division; and a signal applied at connector 12 will yield two equal amplitude isolated outputs of opposite phases at the connectors 10 and 11.

The basic hybrid circuitry by way of which the aforesaid functions are developed is shown in idealized form, in FIGURE 2, to include three ideal inductive units, 13–15. Ports 9'–12' for that circuitry correspond to the connectors 9–12 in FIGURE 1, and the legends A, B, A & B, and A–B there designate the same type of signal conditions. Desired hybrid circuit functions are intended to be realized as the result of pure or "ideal" inductive effects, without appreciable variation in circuit interactions as the signal frequencies are varied. From a practical standpoint, however, this frequency dependence is significant and prevents the theoretical objectives from being met satisfactorily, primarily because of changes in effective shunt and series inductive leakage parameters. Ideally, the signals of various frequencies applied to primary winding 13*a* of transformer 13 are to be translated efficiently without mismatch or reflections to the secondary 13*b*, from whence they will be applied to the center tap 14*c* of coil 14, between the coil halves 14*a* and 14*b*, and effect a division of power output as between the ports 10' and 11'; no output would appear at the remaining port, 12', because one of its transformer windings, 15*a*, is connected across the ends of the coil halves 14*a* and 14*b* and thus would deliver no net signal to the port-feeding winding 15*b*. When two unlike signals, A and B, are applied to ports 10' and 11', they will produce a difference output signal (A–B) at port 12', because winding 15*a* will then experience a net signal difference and flow of resulting currents through it. Similarly, signals A and B will cause combined currents to flow through transformer winding 13*b*, with consequent translation to the port 9' via winding 13*a*, and summation is thus produced. Signals applied to port 12' are reproduced at the ports 10' and 11', with opposite phasings because of their appearances at the different ends of transformer winding 15*a*, and the port 9' then witnesses no net signal because the level of voltage at center tap 14*c* remains at about ground level, with no resulting flow of current through winding 13*b*. For purposes of the described performance characteristics, the transformation ratio of winding 13*a* related to winding 13*b* is made $1:\sqrt{2}$, windings 14*a* and 14*b* are formed with a unity ratio (1:1), and the transformation ratio of winding 15*a* related to winding 15*b* is made 2:1.

In practical embodiments, the inductive units 13–15 are not ideal for the described purposes, principally because of the inductive leakage parameters. Inductive unit 16 in FIGURE 3 represents an inductively coupled circuit such as one of the transformers in FIGURE 2, for example, and the leakage parameters associated with its two coupled windings 16*a* and 16*b* are found to include the effective shunt inductance parameter 17 (labelled $L_1$) and effective series inductance parameter 18

$$\left(\text{labelled } L_1\left(\frac{1-k^2}{k_2}\right)\right)$$

These parameters are related in accordance with the said labelling, the constant, *k*, being equal to $M/\sqrt{L_1L_2}$, where M is the transformer mutual inductance, $L_2$ is the inductance of winding 16*b*, and $L_1$ is the inductance of winding 16*a*. Problems concerned with mismatch, reflection, attenuation, isolation, and the like, are seriously compounded by the effective parameter variations occurring with variations in frequency of the signals being processed by the hybrid equipment. In part, these problems are minimized by constructions of the inductance units which improve their isolations from one another and which maintain their leakage parameters substantially constant. This involves separate enclosures of bifilar-wound inductance units within different housings of ferrite material, and, further, the mechanical spacing of the three units on a non-magnetic circuit board. In addition, the inductive leakage parameters are made part of bandpass filter circuitry, with small capacitance elements being introduced to achieve the desired bandpass filter characteristics for the symmetrical hybrid network over the frequency range of interest.

A compensated hybrid device which possesses broadband operating capabilities, as well as offering the above-described functions, is illustrated in a special schematic form in FIGURE 4. There, the inductive units 13', 14' and 15' correspond to the units 13–15, resepectively in FIGURE 2, and the double-dashed linework 13*s*, 14*s*, and 15*s* respectively symbolize the enclosures by magnetic shielding material, such as a low-loss ferrite. "Equivalent-circuit" shunt and series leakage inductance parameters are found to be effective in various portions of the network, and, although these are not actually present as separate physical inductance elements, they are also included, within single-dashed linework, in the illustration. The units 13'–15' thus represent idealized inductive elements in the network. In the case of transformer 13', for example, shunt and series leakage parameters 19 and 20 are effective at the illustrated sites nearer the port 9*a*. Shunt capacitance 21, portrayed as a variable trimmer-type capacitor, is tuned with the shunt inductance at a midfrequency of a frequency range and aids in converting that portion of the network into a bandpass filter which optimizes the flow of signals over a broad range of frequencies at which the network is to be used. Inductive leakage parameter 22 is effective serially in the connection between the other winding of transformer 13' and the center tap of coil 14', and an added series capacitor 23 provides a resonant tuning of series inductance effects there at the midfrequency of the same frequency range. Series capacitance 24 at the site of port 12*a* functions in the same manner in relation to the series inductance witnessed there, the shunt and series leakage inductances 25 and 26 are shown to characterize effective inductive parameters of the balun transformer 15'. Shunt leakage inductance parameter 27 is effective across the center-tapped coil 14' and the paralleled winding of the transformer 15', with the paralleled tuning capacitor 28 providing compensation by way of its tuning with the inductance at that site at about the midfrequency of the intended operating band. Capacitors 29 and 30 across the ports 12*a* and 11*a*, respectively, complete the tuning of the device as a broadband filter throughout. The broadband filter sections are placed in an interactive filter network which minimizes the reflections of voltage from one section to another, in accordance with known techniques exploited in filter design. To the extent possible, the turns and core geometry of the inductance units are selected to make the effective shunt and series inductances correspond to about the optimum values for realization of the bandpass filter network using small, low-loss, and inexpensive filter capacitors.

Desired bandpass filter characteristics for the entire network can be achieved in various sections of the network without using all of the capacitors shown in FIGURE 4, and without considering that the effective series and shunt impedances are necessarily lumped in the positions illustrated. For example, the broadband hybrid network of FIGURES 5 and 6 merely includes two trimmer-type capacitors, 31 and 32, and two fixed capacitors, 33 and 34, to achieve similar results with three similar inductance units, 13''–15'', corresponding to and connected in the same general way as the units 13'–15' and 13–15. Port connections 9*b*–12*b* correspond to the ungrounded connections of ports 9–12, 9'–12', and 9*a*–12*a*, in the preceding figures, the various groundings being accomplished via the peripheral conductors 35 deposited on the insulating printed circuit board 36 on which the components are mounted in accordance with practices common in the printed-circuit art. Other interconnections between circuit elements are of similar type, deposited connection 37 being typical. The circuitry in FIGURE 5 may be traced to establish that trimmer capacitor 31 is shunted across port 9*b*, and the proximate winding of matching transformer 13″, that capacitor 33 is in series with the same winding, that capacitor 34 is in series with the balun transformer winding connected to port 12*b*, and that trimmer capacitor 32 is connected between circuit ground and one end of both the center-tapped coil 14″ and the paralleled winding of balun transformer 15″. Bifilar winding of the transformer coils provides maximum coupling, and the various inductance units are further separately encased and shielded within hollow containers of low-loss ferrite material or the like, as illustrated, the latter being of a known miniature "cup core" type, for example. Minor capacitance adjustments are afforded by the trimmer-type capacitors 31 and 32 before the device is finally packaged, but the printed-circuit assembly is then solidly potted within a surrounding conductive enclosure such as the housing 8*a* in FIGURE 1. No external adjustments are then required, and all capacitance settings are maintained fixed. Encapsulating or potting materials used are of known electrically- and magnetically-non-conductive form, and the resulting integrated solid structure can well withstand severe environmental conditions such as those of shock, vibration, temperature and moisture.

Those skilled in the art will appreciate that the illustrated inductance units may be varied, to autotransformer-type elements in some instances, and that the principal sections of the hybrid device may have the needed capacitance elements introduced at various sites other than those specifically described herein, to achieve good bandpass filter characteristics while maintaining needed isolations and matchings. Based upon the recognitions and teachings described herein, the improved hybrid devices may be produced in different sizes to operate in different frequency ranges. Accordingly, it should be understood that the specific embodiments disclosed are intended to be of a descriptive rather than a limiting character, and that various modifications, combinations and substitutions may be effected in practice of these teachings without departing either in spirit or scope from this invention in its broader aspects.

What I claim is new and desire to secure by Letters Patent of the United States is:

1. Broadband electrical hybrid apparatus comprising a pair of coil sections each having a different connection port at one end thereof, balance-to-unbalance transformer means having winding means connected with said coil sections at the sites of said connection ports and inductively coupling signals between a third connection port and said coil sections, transformer means including winding means connected with the other ends of said coil sections to conduct net currents flowing through said coil sections and thereby inductively coupling signals between a fourth connection port and said coil sections, and means tuning the effective shunt and series inductances of said coil sections and transformer means in bandpass filter relationship, whereby the power of signals independently applied to said fourth port and to said third port is divided equally between said different ports, and whereby signals applied to said different ports produce summation signals at said fourth port and difference signals at said third port.

2. Broadband electrical hybrid apparatus as set forth in claim 1 wherein said coil sections and said transformer means are physically and magnetically separated, and further including three high-frequency magnetic cores, one of said cores enclosing and shielding said core sections, and the other of said cores each independently enclosing and shielding a different one of said transformer means, and wherein said tuning means are tuned with said inductances at substantially the mid-frequency of a predetermined band of radio frequencies.

3. Broadband electrical hybrid apparatus comprising center-tapped coil means having different connection ports at the different ends thereof, balance-to-unbalance transformer means including winding means paralleled with said center-tapped coil means and inductively coupling signals between a third connection port and said coil means, transformer means including winding means connected with said coil means to conduct net currents flowing through the halves of said coil means and thereby inductively coupling signals between a fourth connection port and said coil means, and means tuning the effective shunt and series inductances of said coil means and transformer means in bandpass filter relationship, whereby the power of signals independently applied to said fourth port and to said third port is divided equally between said different ports, and whereby signals applied to said different ports produce summation signals at said fourth port and difference signals at said third port.

4. Broadband electrical hybrid apparatus comprising center-tapped coil means having different sets of terminals connected at the different ends thereof, balun transformer means including winding means paralleled with said center-tapped coil means and inductively coupling signals between a third set of terminals and said center-tapped coil means, transformer means including winding means serially connected with the center tap of said coil means and inductively coupling signals between a fourth set of terminals and the center tap of said coil means, and capacitor means connected in bandpass filter relationships with effective shunt and series inductances of said coil means, transformer means, and balun transformer means, whereby the power of signals independently applied to said fourth set of terminals and to said third set of terminals is divided equally between said different sets of terminals, and whereby signals applied to said different sets of signals produce summation signals at said fourth set of terminals and difference signals at said third set of terminals.

5. Broadband high-frequency electrical hybrid apparatus comprising a magnetically-shielded center-tapped coil having different connection ports coupled with different ends thereof, magnetically-shielded balun transformer means including winding means paralleled with said ceter-tapped coil and inductively coupling signals between a third connection port and said center-tapped coil, transformer means including a winding serially connected with the center tap of said coil and inductively coupling signals between a fourth connection port and the center tap of said coil, and capacitor means tuning the effective shunt and series inductances of said coil and said transformer means in bandpass filter relationship, said tuning being at substantially the mid-frequency of a predetermined range of radio frequencies.

6. Broadband high-frequency electrical hybrid apparatus as set forth in claim 5 further comprising three separate ferrite enclosures each substantially fully surrounding a different one of said transformer means and said coil, a non-magnetic mounting member, and means mounting said enclosures in spaced relationship on said mounting member.

7. Broadband high-frequency electrical hybrid apparatus as set forth in claim 6 further including a non-magnetic housing for said enclosures, mounting member, and capacitor means.

8. Broadband high-frequency electrical hybrid apparatus comprising a first inductance section including a center-tapped coil having different terminals at the ends thereof forming different connection ports with a network ground, a second inductance section including a balance-to-unbalance transformer having one winding means paralleled with said coil and another winding means connected with a third terminal and the network ground to form a third connection port, a third inductance section including one winding means connected serially between the center tap of said coil and the network ground and another winding means connected with a fourth terminal to form a fourth connection port with the network ground, and capacitor means tuning the effective shunt and series inductances of all of said sections in interactive bandpass filter relationship, said tuning being at substantially the mid-frequency of a predetermined range of radio frequencies.

9. Broadband high-frequency electrical hybrid apparatus as set forth in claim 8 wherein each of said inductance sections includes separate ferrite shielding material substantially fully enclosing the inductanc elements thereof, and further comprising non-magnetic means mounting said shielding material for said sections in physically spaced relationship.

10. Broadband high-frequency electrical hybrid apparatus as set forth in claim 8 wherein the transformation ratio between said other winding means and said one winding means of said third inductance section is substantially $1:\sqrt{2}$, wherein the winding ratio of the two halves of said coil is substantially 1:1, wherein the transformation ratio between said one winding means and said other winding means of said second inductance section is substantially 2:1, and wherein said one and other winding means of said sections are in bifilar wound relationship.

11. Broadband high-frequency electrical hybrid apparatus as set forth in claim 9 wherein said capacitor means includes at least one variable capacitor, and further comprising potting material rigidly encapsulating said shielded inductance elements, mounting means and capacitor means, including said variable capacitor, and further comprising electrically-conductive non-magnetic material housing the encapsulated apparatus.

References Cited by the Examiner

Alford, A., and Watts, C.: I.R.E. Convention Record, 1956, Part I, vol. 4 (page 176).

HERMAN KARL SAALBACH, *Primary Examiner.*

A. R. MORGANSTERN, *Assistant Examiner.*